Figure 1:
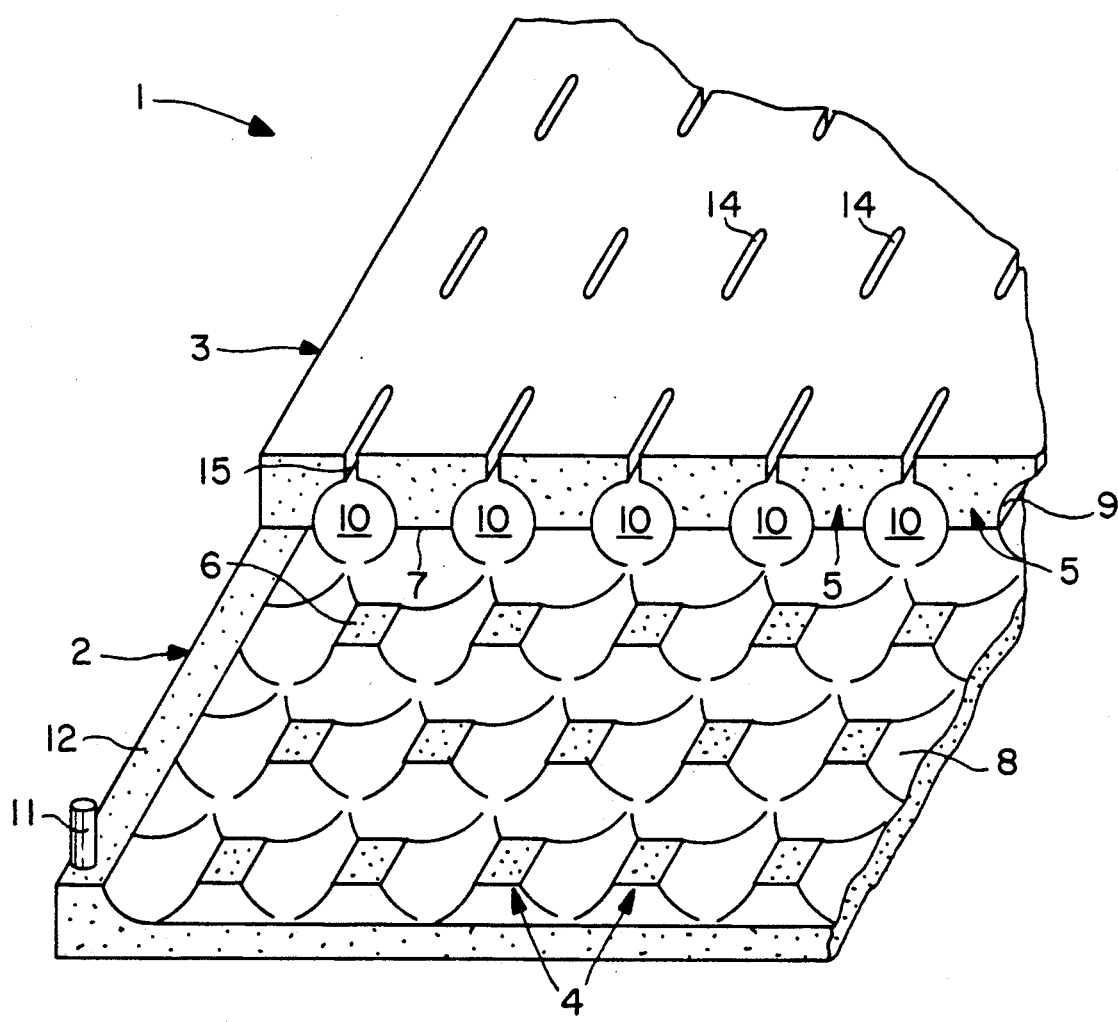

United States Patent [19]
Liane

[11] Patent Number: 5,053,124
[45] Date of Patent: Oct. 1, 1991

[54] ROTTING-SLAB SYSTEM

[76] Inventor: Schumacher Liane, Feldstrasse 19, 5653 Leichlingen, Fed. Rep. of Germany

[21] Appl. No.: 427,852

[22] PCT Filed: Mar. 11, 1988

[86] PCT No.: PCT/DE88/00138
§ 371 Date: Oct. 5, 1989
§ 102(e) Date: Oct. 5, 1989

[87] PCT Pub. No.: WO88/07984
PCT Pub. Date: Oct. 20, 1988

[30] Foreign Application Priority Data
Apr. 8, 1987 [DE] Fed. Rep. of Germany ....... 3711816
Dec. 18, 1987 [DE] Fed. Rep. of Germany ....... 3743027

[51] Int. Cl.$^5$ .............................. B01D 24/24
[52] U.S. Cl. ................ 210/151, 210/232, 210/293
[58] Field of Search ............ 71/9, 10; 210/151, 291, 210/293, 232, 150

[56] References Cited
U.S. PATENT DOCUMENTS
4,139,640 2/1979 Kipp, Jr. .......................... 71/9 X FOREIGN PATENT DOCUMENTS
1036457 4/1953 France .

Primary Examiner—Frank Spear
Attorney, Agent, or Firm—Brooks & Kushman

[57] ABSTRACT

A composting plate system cna be used to compost cut plants or parts of plants. In order to collect the noxious liquid substances produced during composting and to prevent them from penetrating the ground water, the composting plate system comprises at least one liqud-impermeable lower plate (2) to be placed on the consolidated soil, an upper support plate (3), provided with orifices (14), separating pieces (4, 5) arranged between the lwoer plate (2) and the support plate (3) so as to create a liquid-collecting space and/or a liquid-conducting system between both plates (2, 3) and at least one liquid outlet from the intermediate space between the plates. This system, which can extend over large surfaces, makes it possible to collect the noxious substances effectively and at the same time to aerate the compost thoroughly from below.

17 Claims, 5 Drawing Sheets

ROTTING-SLAB SYSTEM

The invention relates to a rotting-slab system for the treatment of loose material, in particular for composting, dewatering and the like and for the treatment of gases, by means of a bed of filter material situated on the rotting-slab system.

In the production of so-called green composts from, for example, cut grass, shredded material from trees or the like, relatively large quantities of humic acids and other pollutants are produced. So far, green composts are stored on the ground. The pollutants produced during the rotting process, which are liquid or, for example, soluble in rainwater, pass directly into the groundwater and pollute the water resources to a considerable degree.

There are furthermore biofiltration processes in which, for example, a waste gas to be purified is passed via a distribution system through a bed of filter material. As filter material, a biomass is used, composed, for example, of compost from refuse, fibrous peat or the like, the gas to be purified coming into intensive contact with the biomass as it flows through the bed via the moisture film of the carrier material. The substances to be removed from the gas are converted or broken down microbially or alternatively simply absorbed. The process operates at high moisture contents of the filter material, with the result that large quantities of liquid loaded with pollutants are produced. The process is carried out in expensive liquid-tight tanks.

The object of the invention is to create a slab system for the storage of loose material to be treated or the biofilter material, respectively, which is simple in structure, is easily laid, permits a good gas flow through the material and is liquid-tight towards the bottom.

This object is achieved by a slab system which is characterized by at least one liquid-impermeable lower slab for resting on the consolidated ground, an upper supporting slab provided with passage openings, further by spacers between the lower slab and the supporting slab to create a liquid-receiving space and/or a liquid channel system and/or a gas feed system between the two slabs and at least one liquid outlet from the space between the two slabs and/or a gas inlet.

By virtue of the system according to the invention, which can be laid out over a large area, a facility is created with very simple means which catches the liquids emerging, for example, from the compost mass or the biofilter material and prevents the pollutants from penetrating into the ground. At the same time, the system provides good aeration or a good gas flow through the filter mass from below, so that the composting or filtering process is advantageously influenced and accelerated thereby. By appropriate robust design of the slabs, the system can be driven over by vehicles and equipment.

The lower slabs can be composed of concrete. Preferably, both the lower slabs and the supporting slabs are produced from glass fibre-reinforced concrete, so that relatively thin and light slabs are adequate which can be transported and laid without great expense. Even thin slabs of glass fiber-reinforced concrete permit high point loading.

For simplification of the production and laying of the system the spacers can be attached to at least one of the two slabs.

Preferably, the spacers are arranged at equal distances from one another in perpendicularly intersecting rows, so as to create passages within the space in the two main directions.

A particular expedient embodiment of the spacers consists in these being provided in the same shape and arrangement both on the upper side of the lower slab and on the underside of the supporting slab and when the slabs are laid one on top of the other rest exactly against one another.

The abutment surfaces of the spacers, which surfaces rest against one another, are expediently round or square. At the same time, starting from the bearing surfaces, the side faces of the spacers preferably merge in an arc shape into the respective slab plane, arch-like supports thereby being created which considerably increase the loading of the slab system.

Semi-cylindrical recesses can be formed between the respective parallel lateral edges of the respective adjoining bearing surfaces, so that when the slabs are resting one on top of the other, perpendicularly intersecting free passages having a circular cross-section are formed. These cross-sections should have a free diameter of about 8 to 15 cm, preferably of 12 cm. With these dimensions of the passage cross-sections, satisfactory air circulation which, for example, accelerates the composting, is guaranteed. The preconditions for simple and thorough cleaning of the slabs are also created thereby.

The slabs are expediently of rectangular or square design and, in the direction of one lateral edge, are laid with a slight gradient towards a drainage channel. In the drainage channel, the liquid running out of the interspaces of a plurality of slab units is collected and guided to a collecting tank from which disposal can be carried out.

The slabs are preferably provided, at least at the long sides, with a continuous rim at the height of the spacers. By means of this measure, the liquid collected in the interspace is prevented in a very simple manner from running down at the side of the lower slab and penetrating into the ground. It is thereby also possible to lay the slabs next to one another without further ado.

Alternatively, the edges of the slabs can also be open and be sealed in the edge region of the system by boundary stones, concrete barriers or the like.

If it is desired to pass the aeration system through the entire system composed of a plurality of individual elements, the mutually adjoining edges of the lower slabs can each have a step-shaped shoulder, the two shoulders overlapping when the slabs are laid and a seal being insertable into the overlap region. As a result, a lateral rim can be omitted since there is sufficient sealing between the lower slabs. However, the seal can also be employed as an additional measure in the case of lower slabs having a lateral rim.

Alternatively, the mutually adjoining edges of the lower slabs can have grooves with inserted sealing strips, it thereby being possible to create an adequate seal when the individual slabs are laid against one another laterally.

For centering the slabs relative to one another, coupling rings are preferably provided which surround with a positive fit the regions of the spacers which rest on one another. By this measure, the upper slabs are reliably fixed relative to the lower slabs.

The dividing line between the individual slabs preferably runs through the centres of the spacers, spacer quarters in each case being created in the corners of the slabs, which quarters, together with the quarters of the three adjoining slab corners, form a full spacer. A coupling ring can then be pushed onto the four adjoining quarters, so that with the aid of the coupling rings the lower slabs and upper slabs lying next to one another can also be reliably fixed.

At their upper side provided with the spacers, at least the lower slabs can be provided with a plastic coating which shields the concrete against, for example, the aggressive liquids produced during composting and additionally acts as a liquid seal. During production, a plastic sheet can be used as hollow mould for the concrete part, said sheet then remaining as permanent formwork on the concrete part.

The passage openings provided in the supporting slabs are expediently designed as slots arranged between the spacers. These slots are preferably widened downwards in a funnel shape, so that blocking by compost mass which has been pressed in can be prevented.

The slots are expediently arranged obliquely to the direction of the passages, in particular preferably with alternately opposite angles of obliquity, it thereby being possible to further improve the throughflow of gas.

The slabs of the system can be of any size. However, the slab size is preferably selected such that the individual slabs can be handled easily. It is also perfectly possible to produce the slabs in tile size only and to assemble the system therefrom, quarters being formed in each case only in the four corners as spacers.

Figure 2:
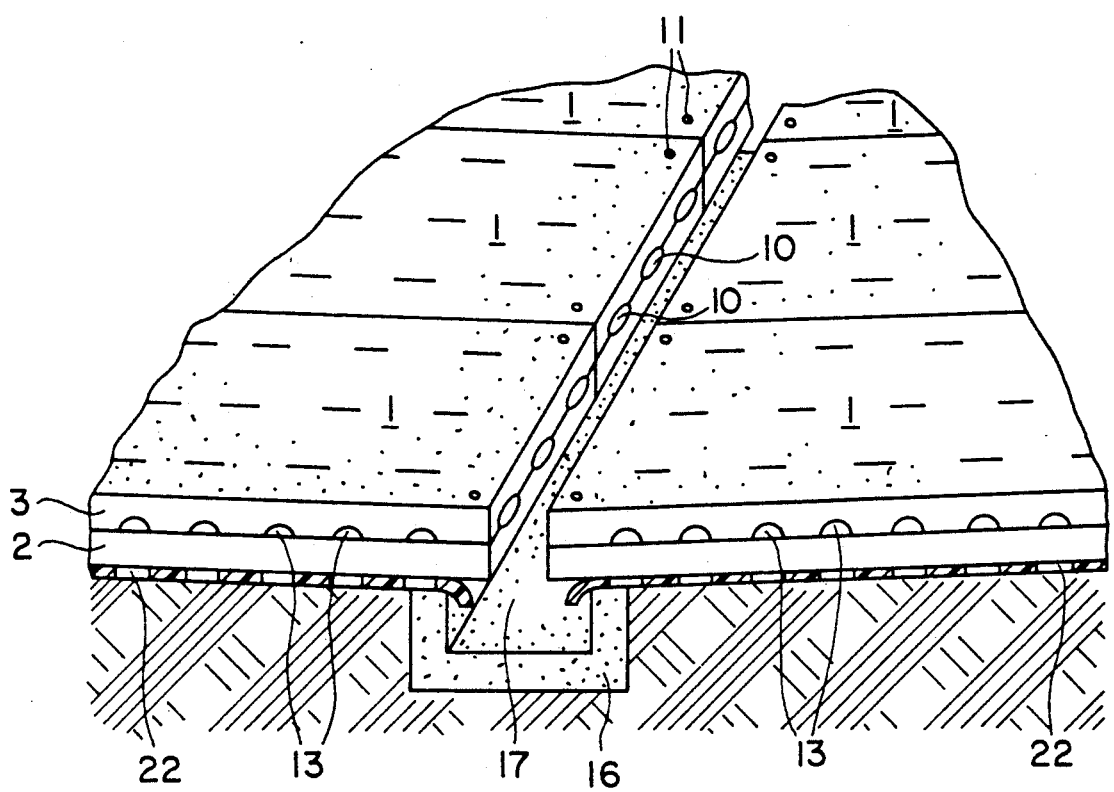
Figure 3:
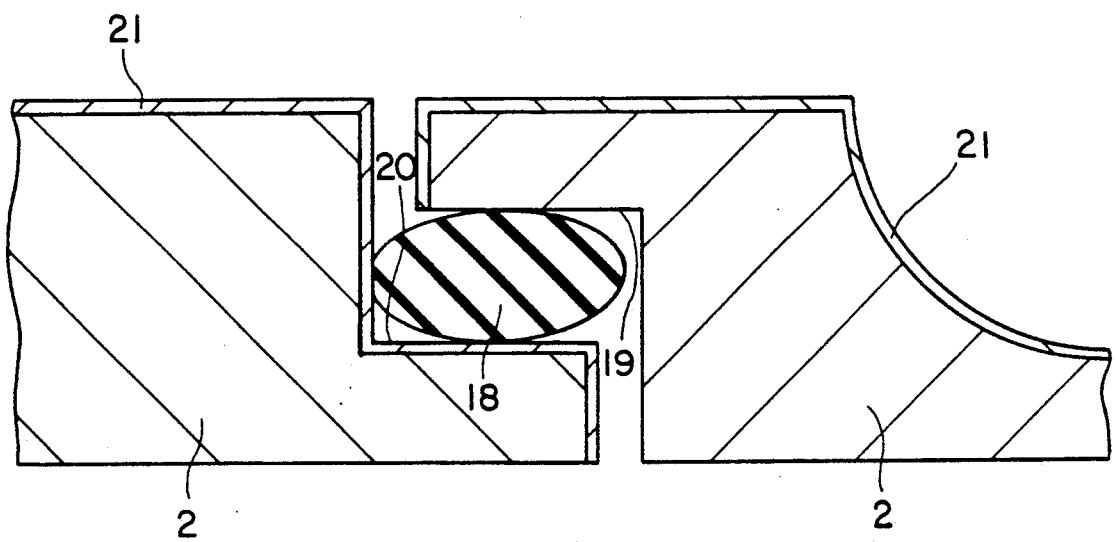
Figure 4:
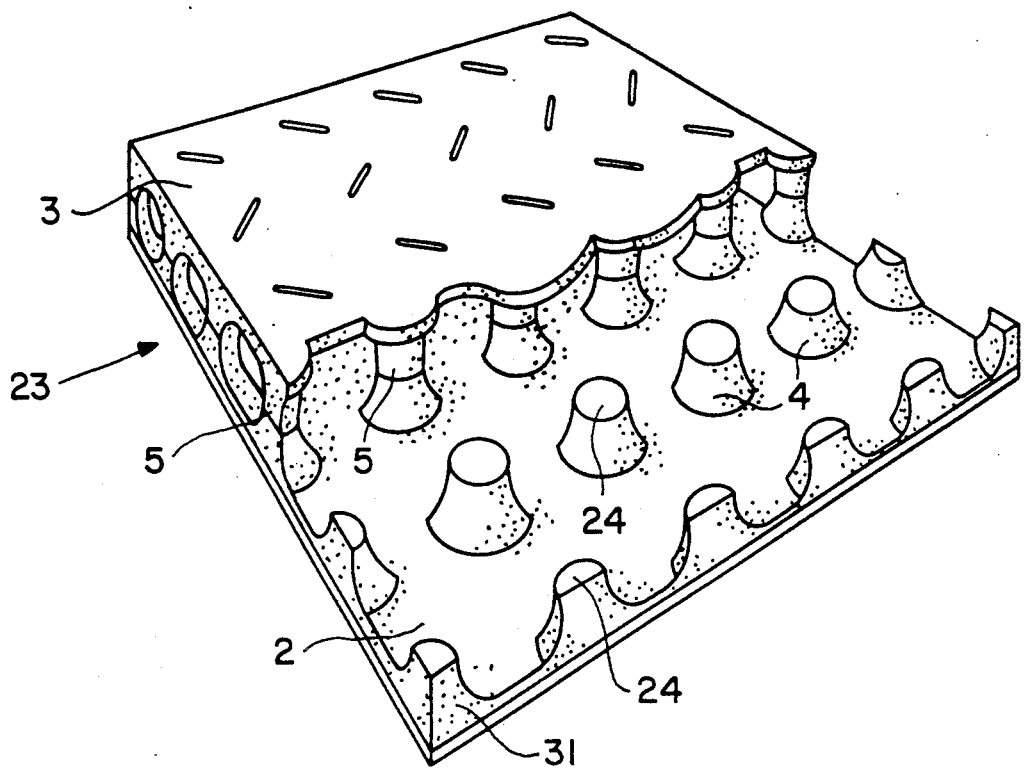
Figure 5:
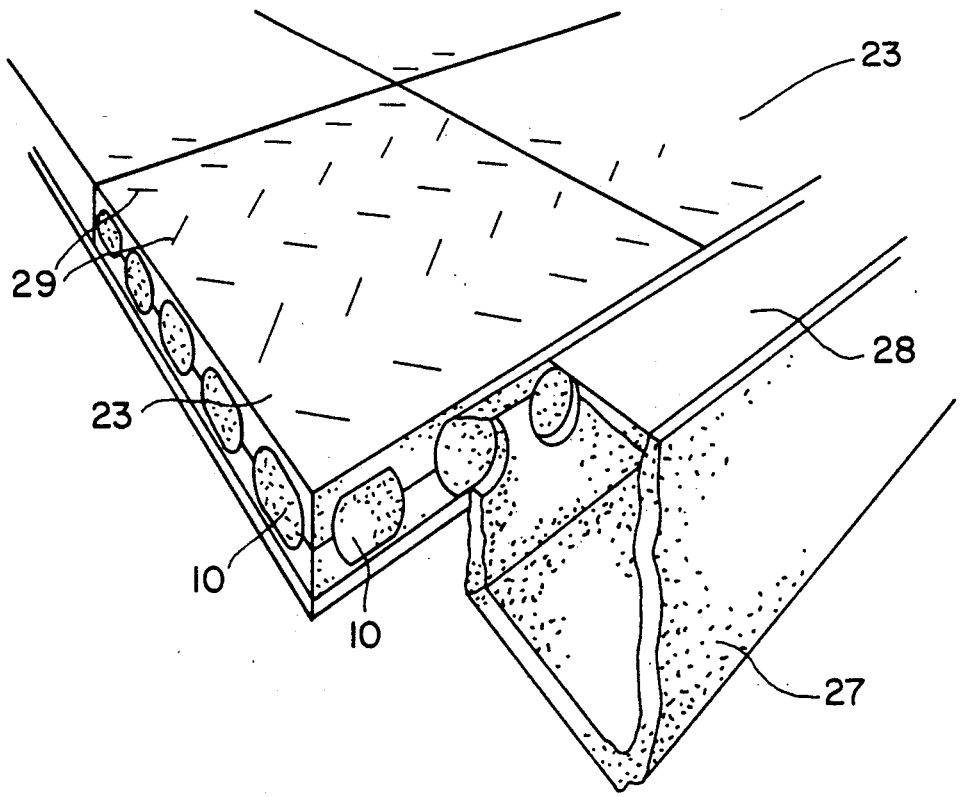
Figure 6:
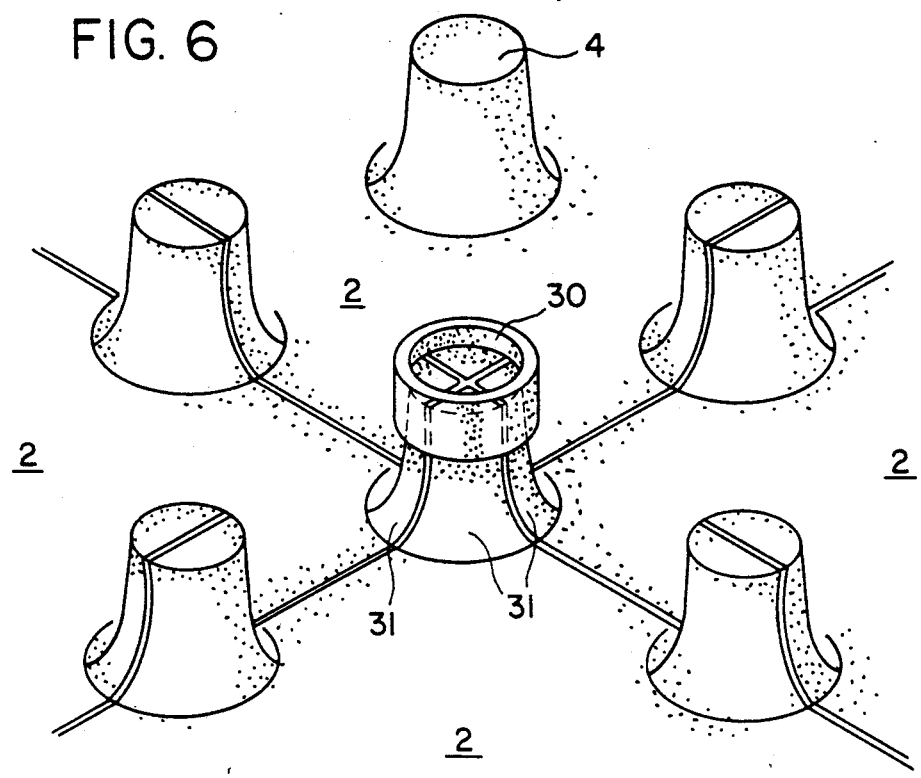
Figure 7:
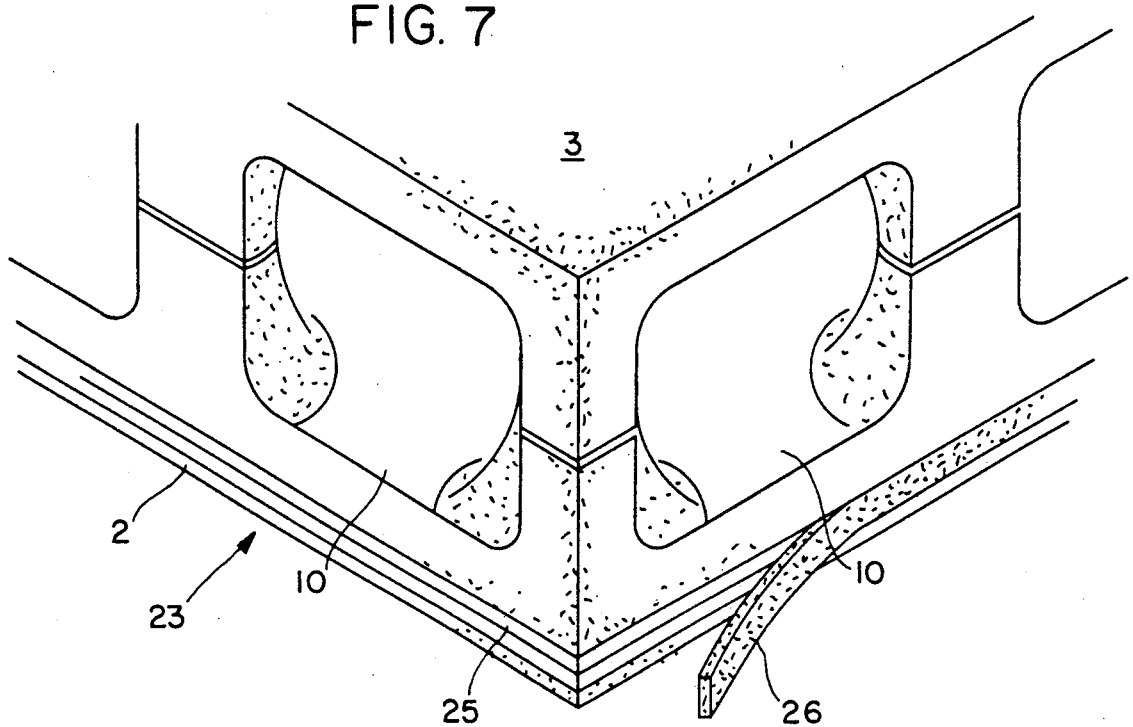

The invention is illustrated by way of example in the drawing and described in detail below with reference to the drawing, in which:

FIG. 1 shows, in perspective representation, a section of a lower slab with a supporting slab laid on top and partially cut away, FIG. 2 shows a representation of a plurality of slabs, laid to form a system, in combination with a drainage channel, FIG. 3 shows the sealed edge region of two lower slabs of another embodiment, FIG. 4 shows, in perspective representation, a section of another exemplary embodiment of a lower slab with a supporting plate laid on top and partially cut away, FIG. 5 shows a representation of a plurality of slabs in accordance with FIG. 4, laid to form a system, in combination with a lateral drainage channel, FIG. 6 shows in enlarged representation, the region of four mutually adjoining lower slabs in accordance with FIG. 4 and FIG. 7 shows, likewise in enlarged representation, the edge region of a lower slab with a supporting slab laid on top.

According to FIGS. 1 and 2 of the drawing, the system of rotting slabs comprises a plurality of individual elements 1 which are laid next to one another and are in each case composed of a lower slab 2 and a supporting slab 3 resting on the latter.

Both slabs 2 and 3 are produced from glass fiber-reinforced concrete.

Spacers 4 and 5 are arranged on the upper side of the lower slab 2 and on the underside of the supporting slab 3 in accordance with a predetermined pattern, said spacers resting exactly on one another when the slabs 2 and 3 are laid one on top of the other.

The mutually adjoining bearing surfaces 6 and 7 of the spacers 4 and 5 are of square design and, starting from the square bearing surfaces 6 and 7, the side faces 8 and 9 of the spacers merge in an arc shape into the respective slab plane. As a result, a semi-cylindrical recess is produced between the opposite parallel lateral edges of the respective adjacent bearing surfaces 6 and 7 of the respective slab 2 and 3. When the slabs 2 and 3 rest on one another in their predetermined position, the semi-cylindrical recesses form perpendicularly intersecting passages 10 of circular cross-section.

The cross-sections of the passages must be sufficiently large not only to allow the liquid emerging from the compost to be led away without hindrance but also to ensure sufficient and controlled aeration over the entire area of the slabs.

The lower slab 2 and the supporting slab 3 are in each case of rectangular design and have the same dimensions. In order to ensure that the bearing surfaces 6 and 7 of the spacers 4 and 5 rest exactly on one another, centering pins 11 can be pushed into corresponding centering bores in the corners of the slabs 2 and 3.

According to FIGS. 1 and 2 of the drawing, continuous rims 12 which have the same height as the spacers 4 are arranged at the long sides of the lower slabs. The rims 12 provide a lateral termination for the lower slab 2, so that a trough is in each case formed between the two outer rims 12 which excludes the possibility of the liquid running down laterally from the lower slabs. Despite this, however, aeration in the transverse direction is also possible since semicircular passages 13 at an elevated level remain free between the lateral spacers of the supporting slab 3, as can be seen, for example, in FIG. 2.

At its upper side, the supporting slab 3 is provided with slot-shaped passage openings 14 formed between the spacers 5, through which openings the liquid formed during composting can run through onto the lower slab 2. The slots have a funnel-shaped widening 15 towards the bottom in order to prevent blockages.

The rectangular slabs 2 and 3, which can be produced from glass fiber-reinforced concrete, can be relatively thin. From their outer surface to the plane of the spacers 4 and 5, they can have a depth of about 9 cm. At the base of the passages 10, which have a diameter of about 12 cm when the slabs are laid one on top of the other, there then always remains a minimum wall thickness of about 3 cm.

The relatively large passages 10 not only transport away satisfactorily the liquid passing through and provide good aeration of the compost from below, but can also be cleaned rapidly and without problems with the aid, for example, of a water jet or a high-pressure cleaner. They are also suitable for forced aeration systems.

As illustrated in FIG. 2, the individual elements 1, which in each case comprise a lower slab 2 and a supporting slab 3, can be arranged in accordance with a particular laying scheme. A U-shaped drainage channel 16 which is connected to a collecting tank not illustrated in the drawing is, for example, laid in the middle of a rotting site. The individual elements 1 are laid closely next to one another in parallel arrangement, the long sides of the individual elements 1 lying perpendicular to the drainage channel 16. The individual elements are laid with a slight gradient of about 1.5% towards the channel. The ends of the individual elements 1 rest on the edges of the drainage channel 16, the individual elements 1 which are laid on opposite sides of the drainage channel 16 leaving a through-gap 17 between their ends through which the liquid emerging from the inner passages 10 can run into the channel.

The long edges of two adjacent lower slabs which are sealed with respect to one another are illustrated in FIG. 3. An O-ring 18 of, for example, rubber is used as a seal, which is inserted between two overlapping step-shaped shoulders 19 and 20. The gap between two lower slabs 2 laid next to one another can thereby be reliably sealed.

The upper side of the lower slabs 2 illustrated in FIG. 3 is covered with a plastic sheet 21. This not only offers a reliable liquid-tight protection for the lower slabs but also facilitates production in that the premoulded sheet 21 can be used in the manner of permanent formwork as a casting mould for the slabs.

The supporting slabs 3 can of course also be produced by this technique.

If the supporting surface on which the slabs are to be laid cannot be sufficiently consolidated and a displacement of the slabs relative to one another is to be feared, a plastic web 22 or some other kind of seal can be laid under the individual elements as an additional back-up seal. On the side of the drainage channel 16, the sealing web is laid over the channel edge so that the liquid which may have run through between the lower slabs 2 can pass into the drainage channel 16.

In the case of the exemplary embodiment illustrated in FIGS. 4 to 7, the individual elements 23 are of square design and, as in the case of the exemplary embodiment illustrated in FIGS. 1 to 3, in each case likewise comprise a lower slab 2 and a supporting slab 3. The spacers 4 and 5 are in each case provided with round bearing surfaces 24.

When the supporting slabs 3 are laid on the lower slabs 2, perpendicularly intersecting passages 10 are formed just as in the case of the exemplary embodiment described above. In the present exemplary embodiment, however, the edges of the slabs are open, with the result that a system is created to which elements can be added on all sides and which can be assembled to form a surface of any desired size. Of course, here too, it is possible to divide the units into smaller segments with separate aeration systems by sealing the lateral edges in certain regions.

In this exemplary embodiment, the circumferential edges of the lower slabs 2 are provided with grooves 25 into which the sealing strips are inserted, so that when the lower slabs are laid against one another, they form a downwardly sealed base surface. Dewatering is carried out with the aid of drainage channels 27 which are laid at the edge of a system or alternatively between individual system segments and into which the passages 10 open laterally. As illustrated in FIG. 5, in the exemplary embodiments under consideration the drainage channel 27 is covered by means of a cover plate 28 which is at the same level as the surface of the respective supporting slab 3.

In the supporting slabs 3 are arranged once again passage slots 29 which are of similar design to the passage openings 14 in the exemplary embodiment illustrated in FIG. 1. However, the slots 29 are arranged obliquely to the passages 10, in particular at an angle of about 45°. The angles of obliquity run alternately in opposite directions.

As can be seen from FIGS. 4 to 7, the dividing lines between the individual plates 2 and 3 run exactly through the centres of the spacers 2 and 3, with the result that in the edge regions the bearing surfaces 24 are divided into semicircles and in the four corners into quarter circles `s can be seen, in particular, from FIG. 6, the mutually adjoining elements then once more form complete round spacers.

Coupling rings 30 which are pushed over four mutually adjoining quarters 31 are used for holding the slabs together. The respective coupling ring 30 surrounds the four quarters 31 firmly and with a positive fit and protrudes upwards beyond the bearing surface, so that the associated spacer of the supporting slab can engage in this protruding open region of the coupling ring 30, likewise engaging firmly and with a positive fit in the coupling ring 30, so that not only are the individual slab parts held together but the supporting slabs are centered relative to the lower slabs.

I claim:

1. Rotting-slab system for treating loose material, and gases, by means of a bed of filter material situated on the rotting-slab system, having passage openings provided on the upper side, having an inner cavity, connected to the latter, to create a receiving space and having at least one outlet from the cavity, characterized in that at least one liquid-impermeable lower slab (2) for resting on the consolidated ground is provided, in that an upper supporting slab (3) in which the passage openings (14; 29) are formed rests on said lower slab, in that spacers (4, 5) are formed integrally at least on one of the two slabs (2, 3), in that the spacers (4, 5) are arranged at equal distances from one another in perpendicularly intersecting rows, in that, starting from bearing surfaces (6, 7) of the spacers (4,5), side faces (8, 9) of the spacers (4, 5) merge in an arc shape into the respective slab plane and in that an arrangement for locking the supporting slab (3) relative to the lower slab (2) is provided.

2. Rotting-slab system according to claim 1, characterized in that the spacers (4,5) are provided in the same shape and arrangement both on the upper side of the lower slab (2) and on the underside of the supporting slab (3) and when the slabs are laid one on top of the other rest exactly against one another.

3. Rotting-slab system according to claim 2, characterized in that when the slabs (2,3) are resting one on top of the other, perpendicularly intersecting free passages (10) having an essentially circular cross-section are formed.

4. Rotting-slab system according to claim 2, characterized in that the mutually facing bearing surfaces (6,7) of the spacers (4,5) are of rectangular design, preferably square.

5. Rotting-slab system according to claim 2, characterized in that the mutually facing bearing surfaces (24) are of round design.

6. Rotting-slab system according to claim 1, characterized in that the lower slabs (2) and the supporting slabs (3) are composed of glass fiber-reinforced concrete.

7. Rotting-slab system according to claim 1, characterized in that the slabs (2,3) are of rectangular or square design and, in the direction of one lateral edge, are laid with a slight gradient towards the drainage channel (16).

8. Rotting-slab system according to claim 1, characterized in that, at least at one side, the lower slabs (2) are provided with a continuous rim (12) at the height of the spacers (4).

9. Rotting-slab system according to claim 1, characterized in that the edges of the slabs are open and are sealed in the edge region of the system by boundary stones or the like.

10. Rotting-slab system according to claim 1, characterized in that the mutually adjoining edges of the lower slabs (2) each have a step-shaped shoulder (19,20), the two shoulders overlapping when the slabs (2,3) are laid and a seal (18) being insertable into the overlap region.

11. Rotting-slab system according to claim 1, characterized in that the mutually adjoining edges of the lower slabs (2) have grooves (25) with inserted sealing strips (26).

12. Rotting-slab system according to claim 2, characterized in that the coupling rings (30) which surround with a positive fit the regions of the spacers which rest on one another are provided for centering the slabs relative to one another.

13. Rotting-slab system according to claim 12, characterized in that the dividing line between the individual slabs runs through the centers of the spacers, spacer quarters (31) in each case being created in the corners of the slabs, which quarters, together with the quarters of the three adjoining slab corners, form a full spacer, and in that a coupling ring (30) is pushed onto the four adjoining quarters (31).

14. Rotting-slab system according to claim 1, characterized in that, at their upper side provided with the spacers (4), at least the lower slabs (2) are provided with a plastic coating (21).

15. Rotting-slab system according to claim 1, characterized in that the passage openings (14) provided in the supporting slabs (3) are designed as slots arranged between the spacers (5).

16. Rotting-slab system according to claim 15, characterized in that the slots are widened downwards in a funnel shape.

17. Rotting-slab system according to claim 15, characterized in that the passage slots (29) are arranged obliquely to the direction of the passages (10).

* * * * *